United States Patent
Usack

(10) Patent No.: US 6,615,793 B1
(45) Date of Patent: Sep. 9, 2003

(54) VALVELESS REVOLVING CYLINDER ENGINE

(76) Inventor: Victor J Usack, P.O. Box 112, Upton, NY (US) 11973

( * ) Notice: Subject to any disclaimer, the term of this patent is extended or adjusted under 35 U.S.C. 154(b) by 0 days.

(21) Appl. No.: 10/055,702

(22) Filed: Jan. 22, 2002

(51) Int. Cl.7 .................................................. F02B 53/00
(52) U.S. Cl. ...................... 123/242; 123/244; 123/44 D
(58) Field of Search ................................. 123/200, 203, 123/241, 242, 244, 43 R, 44 R, 44 D

(56) References Cited

U.S. PATENT DOCUMENTS

| | | |
|---|---|---|
| 19,715 A | 3/1858 | Rogers |
| 46,470 A | 2/1865 | Hicks |
| 112,688 A | 3/1871 | Cohen |
| 273,162 A | 2/1883 | Sanderson |
| 355,131 A | 12/1886 | Brockie et al. |
| 835,741 A | 11/1906 | Williams |
| 975,485 A | 11/1910 | Waltman |
| 1,285,835 A | 11/1918 | Sunderman |
| 1,341,332 A | 5/1920 | McDonald |
| 3,938,478 A * | 2/1976 | Piper ........................... 123/229 |
| 3,939,808 A | 2/1976 | Kostecki et al. |
| 4,106,443 A | 8/1978 | Trinlzi |
| 4,274,327 A | 6/1981 | Olsgaard |
| 4,572,121 A * | 2/1986 | Chang ......................... 123/303 |

* cited by examiner

Primary Examiner—Hoang Nguyen
(74) Attorney, Agent, or Firm—Michael I. Kroll

(57) ABSTRACT

A revolving cylinder engine having a stationary fixed housing with circumferential intake and exhaust ports and an ignition means, a concentrically positioned revolving cylinder block bored centrally and radially with said radial bore defining a piston compression chamber, and a crank bearing disc concentrically positioned within said central bore of said cylinder block that revolves within said cylinder block wherein the rotation of said crank bearing disc provides for the reciprocating action of the piston traveling through said compression chamber. A planetary gearset is the preferable means for rotating said cylinder block and said crank bearing disc for achieving the timing requirements necessary for precise port alignment in concert with the movement and position of said piston.

4 Claims, 12 Drawing Sheets

TOP OF INTAKE/END OF EXHAUST STROKE

TOP OF INTAKE/END OF EXHAUST STROKE

END OF POWER STROKE

| PLANETARY GEARSET RATIO |
|---|
| UNDER THE CONDITION THAT THE RING GEAR IS FIXED, THE FOLLOWING APPLIES: |
| LET N= THE NUMBER OF TEETH ON THE RING GEAR / THE NUMBER OF TEETH ON THE SUN GEAR. |
| LET R BE THE (MOTION) RATIO BETWEEN THE SUN GEAR AND THE PLANET CARRIER. |
| THEN R = N(1+1/N) = N+1 |
| THE REQUIRED RATIO IS 3:1 |

VALVELESS REVOLVING CYLINDER ENGINE

BACKGROUND OF THE INVENTION

1. Field of the Invention

The present invention relates generally to rotary cylinder engines and, more specifically, to a valveless revolving cylinder engine having a radially bored cylinder block that revolves within a stationary fixed housing with a combustion chamber and intake and exhaust ports and that align with the cylinder bore as the cylinder block rotates through its cycle to control the admission to, the trapping in and the exhausting of the working medium from the cylinder. Low friction and high polar moment of inertia enable the engine to idle at a low RPM. Furthermore, the gas flow potential of the ports enables high RPM power. The area and position of the ports are mechanically varied with engine load and RPM to optimize efficiency over a broad range of engine speeds.

2. Description of the Prior Art

There are other rotating cylinder engines. Typical of these is U.S. Pat. No. 19,715 issued to Rogers on Mar. 23, 1858.

Another patent was issued to Pollack on Feb. 21, 1865 as U.S. Pat. No. 46,470. Yet another U.S. Pat. No. 112,688 was issued to Cohen on Mar. 14, 1871 and still yet another was issued on Feb. 27, 1883 to Sanderson as U.S. Pat. No. 273,162.

Another patent was issued to Brockie et al. on Dec. 28, 1886 as U.S. Pat. No. 355,131. Yet another U.S. Pat. No. 835,741 was issued to Williams on Nov. 13, 1906. Another was issued to Waltman on Nov. 15, 1910 as U.S. Pat. No. 975,485 and still yet another was issued on Nov. 26, 1918 to Sunderman as U.S. Pat. No. 1,285,835 on Nov. 26, 1918.

Another patent was issued to McDonald on May 25, 1920 as U.S. Pat. No. 1,341,332. Yet another U.S. Pat. No. 3,939,808 was issued to Kostecki et al. on Feb. 24, 1976. Another was issued to Triulzi on Aug. 15, 1978 as U.S. Pat. No. 4,106,443 and still yet another was issued on Jun. 23, 1981 to Olsgaard as U.S. Pat. No. 4,274,327.

The two L-shaped stationary hollow steam heads C D, C' D', applied and arranged substantially as described, to constitute stationary journals for the two-hubbed drum or flywheel E, and bearings for the cylinder journals, while they also constitute valves for the induction and education of the steam, substantially as described herein.

The combination and arrangement of steam machinery, operating substantially in the manner and on the principles herein set forth.

In a rotary engine, consisting of a cylinder supported in a trunnion eccentric to the shaft of a flywheel, to a pin on which the piston-rod is connected, the combination of ports n and w in the face of the cylinder with a steam port n and exhaust port q in the bearing, when the said ports are arranged as described.

In a rotary engine, the combination of the cam-track C, piston rod B, carrying a piston-head, b, and having rollers c c at each end, the rotary cylinder A, having ports k k, and the rotary valve G, having ports h I and hollow valve stem g substantially as shown and described.

The combination of the stationary cylindrical casing A, having end covers provided with annular recesses, the revolving cylindrical body B, having the diametric slot, and the rectangular piston P, arranged to traverse the slot, with the circular discs D, sunk in the annular recesses of the end covers of the casing, and having a shaft, S, extended through the casing, and the crank-pin C, extending entirely across the revolving body and through the piston and secured at it's opposite ends, respectively, to the circular disks, substantially as In combination, a stationary frame, a rotary head comprising spaced members, an oscillatory engine mounted between the members of said head, a hollow pivot supporting said engine and subdivided into longitudinal passages which communicated at opposite ends with passages formed in the members of the rotary head, and a crank wheel mounted upon said rotary head and operatively connected with the piston-rod and geared to the stationary frame to effect rotation of the head in the operation of the engine.

In an engine, the combination with a rotary wheel, of concentric gears mounted for rotation independently of each other and independently of the wheel, a motor carried by the wheel, a pinion meshing with said concentric gears and operated by the motor, and operable means for holding eitherof said concentric gears against rotation.

In a rotary internal combustion engine, the combination of a stationary gear, a rotary drive shaft extending axially through said gear, means mounted on said shaft to rotate therewith, a plurality of pinions journaled on said means and geared to the stationary gear, a plurality of cylinders mounted on said frame concentrically of said shaft to rotate together with the frame about the axis of the shaft, there being a group of cylinders for each pinion, pistons in said cylinders, means connecting each group of cylinders to one of said pinions to rotate the pinions for driving the frame and the shaft rotatably, said connections between the pinions and their driving pistons being such that no two cylinders of a group exert their thrust synchronously, and means for conveying and controlling fuel mixture to the cylinders.

In a rotary engine, the combination of a rotatable engine block, a series of cylinder members disposed about the periphery thereof in position for the reciprocation of their pistons transversely of the radii passing therethrough, regulatable means for selectively admitting steam into diametrically oppositely located cylinders, means for exhausting steam to the other pairs of cylinders during the periods of inactivity of the first named pair.

A revolving cylinder internal combustion engine in which a rotor carrying a plurality of piston and cylinder assemblies with their axes at right angles to the rotor axis is mounted in an outer body for rotation responsive to reciprocation of the pistons in the cylinders. In order to improve inlet and exhaust gas control inlet and exhaust to the individual cylinders responsive to rotational movement of the rotor is controlled by cams adjustably carried by the body. Circulation of coolant and/or lubricant through the rotor may be assisted by a centrifugal pumping action responsive to rotor rotation.

A rotary internal combustion engine is described and shown having two piston and cylinder assemblies rotating about a single axis. The pistons reciprocate in rotating cylinders having a four cycle internal combustion engine process to receive air and fuel, to compress the air and fuel, to combust the mixture and to exhaust the gases therefrom. The pistons move in a set relation to each other, being connected by a common rod. The center of rotation of the pistons is dynamic relative to the center of rotation of the cylinders and cylinder blocks. Intake and exhaust valves are positioned about the periphery of the rotor assembly, and have staggered opening and closing schedules in order that air and fuel may be admitted and gases scavenged in accordance with the four cycle internal combustion engine principle. Rotating valve members having diametrical passages are rotated by a common drive, but positioned relative to each other so that their openings sequentially open and close to coordinate with the rotating rotor assembly. Alternative embodiments for use as a compressor are described.

An internal combustion engine, a fluid motor or a pump includes a cylinder block enclosing an elongated cylindrical bore. A double headed piston is slidably mounted within the bore. The piston and cylinder block are rotatable relative to each other about the longitudinal axis of the bore. Rotation is imparted by a sinusoidal cam and a cam follower. Reciprocation of the piston within the bore is accomplished along with corresponding rotational movement of the cylinder block. Opposed ends of the cylinder block include openings which are aligned with and periodically communicate with exhaust and intake chambers. Porting collars are slidably mounted to the cylinder block and are stationary relative to the cylinder.

While these rotating cylinder engines may be suitable for the purposes for which they were designed, they would not be as suitable for the purposes of the present invention, as hereinafter described.

SUMMARY OF THE PRESENT INVENTION

A primary object of the present invention is to provide a valveless revolving cylinder internal combustion engine comprising three concentric elements: a stationary fixed housing with intake and exhaust ports and a combustion chamber within the sidewall thereof, a radially bored cylinder block that revolves within said housing to align the cylinder bore with said ports and combustion chamber, and a crank bearing disc and crank pin pivotally connected to a piston head that travels within the cylinder bore.

Another object of the present invention is to provide a valveless revolving cylinder internal combustion engine having intake and exhaust ports configured accordingly with engine load to provide optimum volumetric efficiency.

One other object of the present invention is to provide a valveless revolving cylinder internal combustion engine that is less complex and more efficient than other internal combustion engines.

Yet another object of the present invention is to provide a valveless revolving cylinder internal combustion engine that can be designed for two-stroke or four-stroke operation.

Still yet another object of the present invention is to provide a valveless revolving cylinder internal combustion engine having an extremely broad RPM range wherein the flow potential of the ports will enable high RPM range.

Another object of the present invention is to provide a valveless revolving cylinder internal combustion engine wherein the crank bearing disc rotates three times per cycle relative to fixed housing—twice per cycle relative to cylinder block.

Another object of the present invention is to provide a valveless revolving cylinder internal combustion engine having a gearset configuration for achieving a rotating block and cylinder. A planetary gearset is one preferred gearset configuration although other appropriate gearsets may be used.

One more object of the present invention is to provide a valveless revolving cylinder internal combustion engine having two different drive members (crank or block) to provide different gear ratios.

Still another object of the present invention is to provide a valveless revolving cylinder internal combustion engine that is economical in cost to manufacture and operate.

Yet another object of the present invention is to provide a valveless revolving cylinder internal combustion engine that is simple and easy to use.

Additional objects of the present invention will appear as the description proceeds.

The present invention overcomes the shortcomings of the prior art by providing a valveless, revolving cylinder internal combustion engine that will run more efficiently and require less maintenance than the engines shown in the prior art due to the elimination of the valve train and the reduction of moving parts.

To the accomplishment of the above and related objects, this invention may be embodied in the form illustrated in the accompanying drawings, attention being called to the fact, however, that the drawings are illustrative only, and that changes may be made in the specific construction illustrated and described within the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
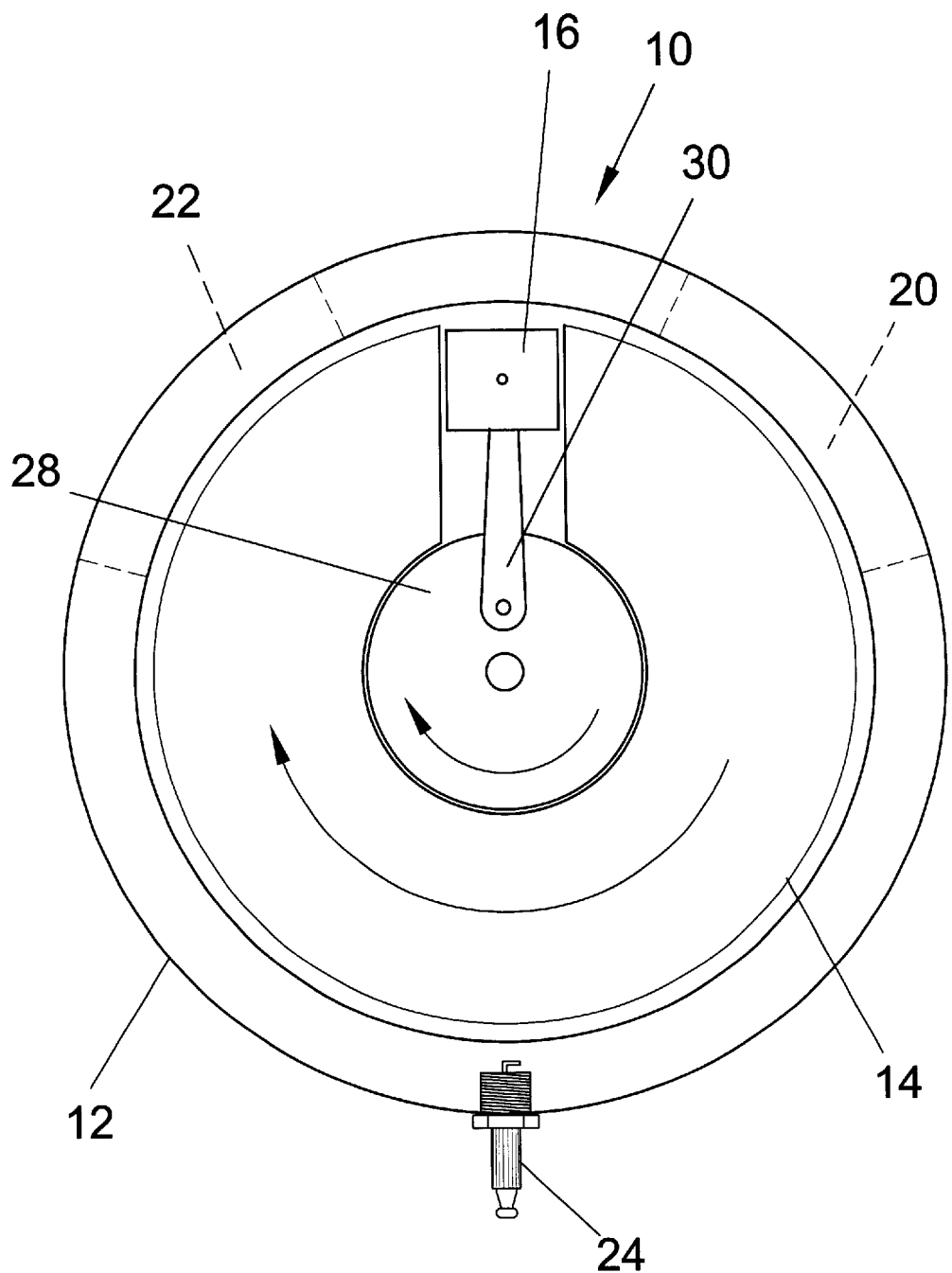
FIG. 1 is a top view of the present invention during the top of intake/end of exhaust stroke.

Turning now descriptively to the drawings, in which similar reference characters denote similar elements throughout the several views, the Figures illustrate the valveless revolving cylinder engine of the present invention. With regard to the reference numerals used, the following numbering is used throughout the various drawing figures.

10 valveless revolving cylinder engine
12 fixed housing
14 cylinder block
16 piston
18 compression chamber
20 intake port 22 exhaust port
24 spark plug
27 crank assembly
28 crank bearing disc
30 connecting rod
32 spline shaft
34 planetary gearset
36 planet carrier
38 sun gear
40 planet gear
42 planetary ring gear
44 spark
46 charge
48 housing wall The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

FIGS. 1–7 are top views of the present invention 10 demonstrating the alignment of the compression chamber 18 with the intake port 20, the exhaust port 22, and the spark plug 24 during operation using a rotating crank bearing disc 28 and pivoting connecting rod 30 to drive the piston 16 back and forth within the compression chamber 18 whereas any other suitable crankshaft mechanism may be used without deviating from the essence of the present invention 10.

FIG. 1 shows the present invention 10 at the end of the exhaust stroke/top of the intake stroke with the piston 16 fully extended peripherally in the compression chamber 18 that is traveling between the exhaust port 22 and the intake port 20 in the wall of the fixed housing 12.

Figure 2:
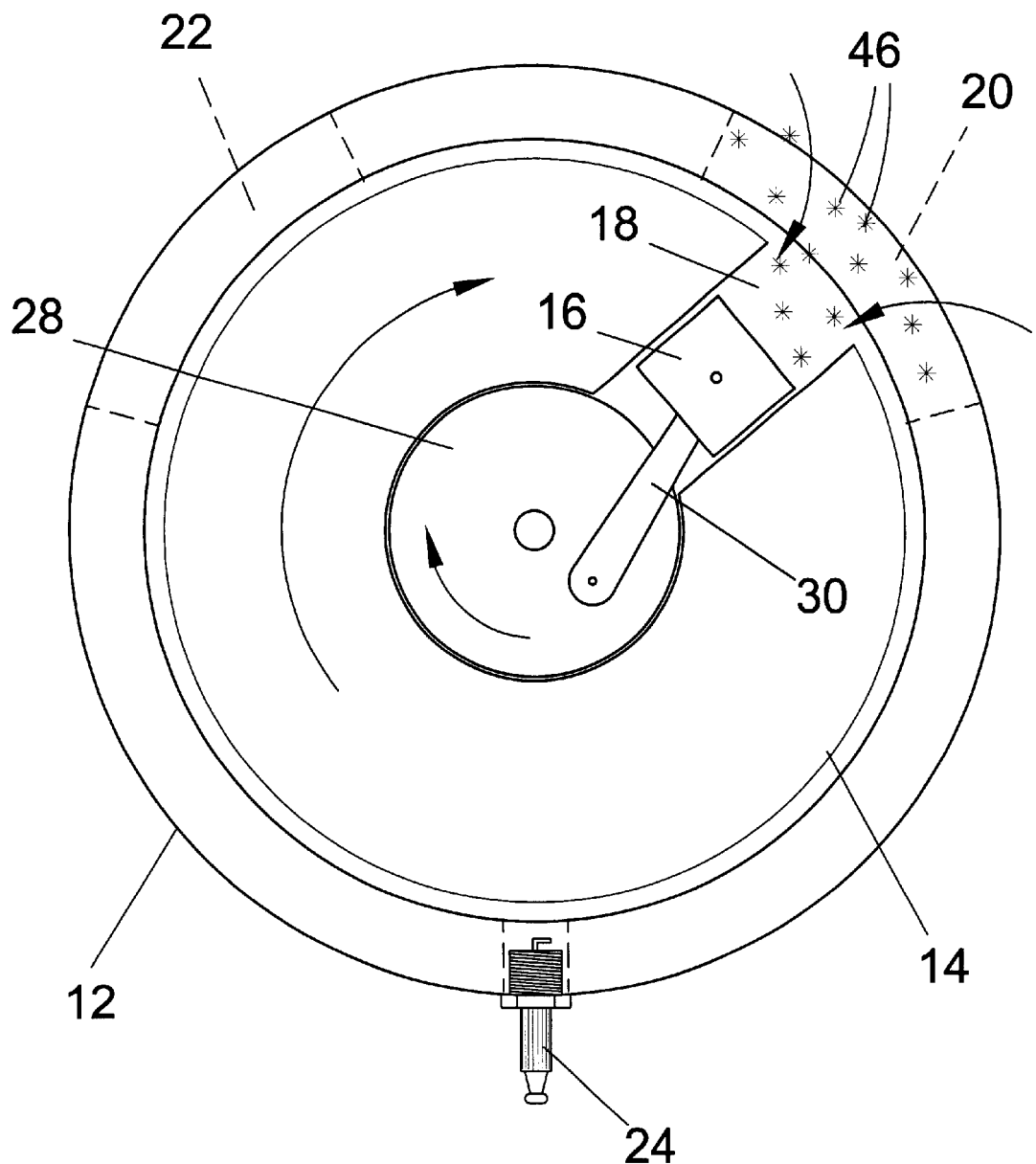
FIG. 2 is a top view of the present invention during the intake stroke.

The intake stroke is shown in FIG. 2 as the compression chamber 18 aligns with the intake port 20 and the rotation of the crank bearing disc 28 and the attached connecting rod 30 pull the piston 16 towards the center thereby drawing a charge 46 through the intake port 20 and into the compression chamber 18.

Figure 3:
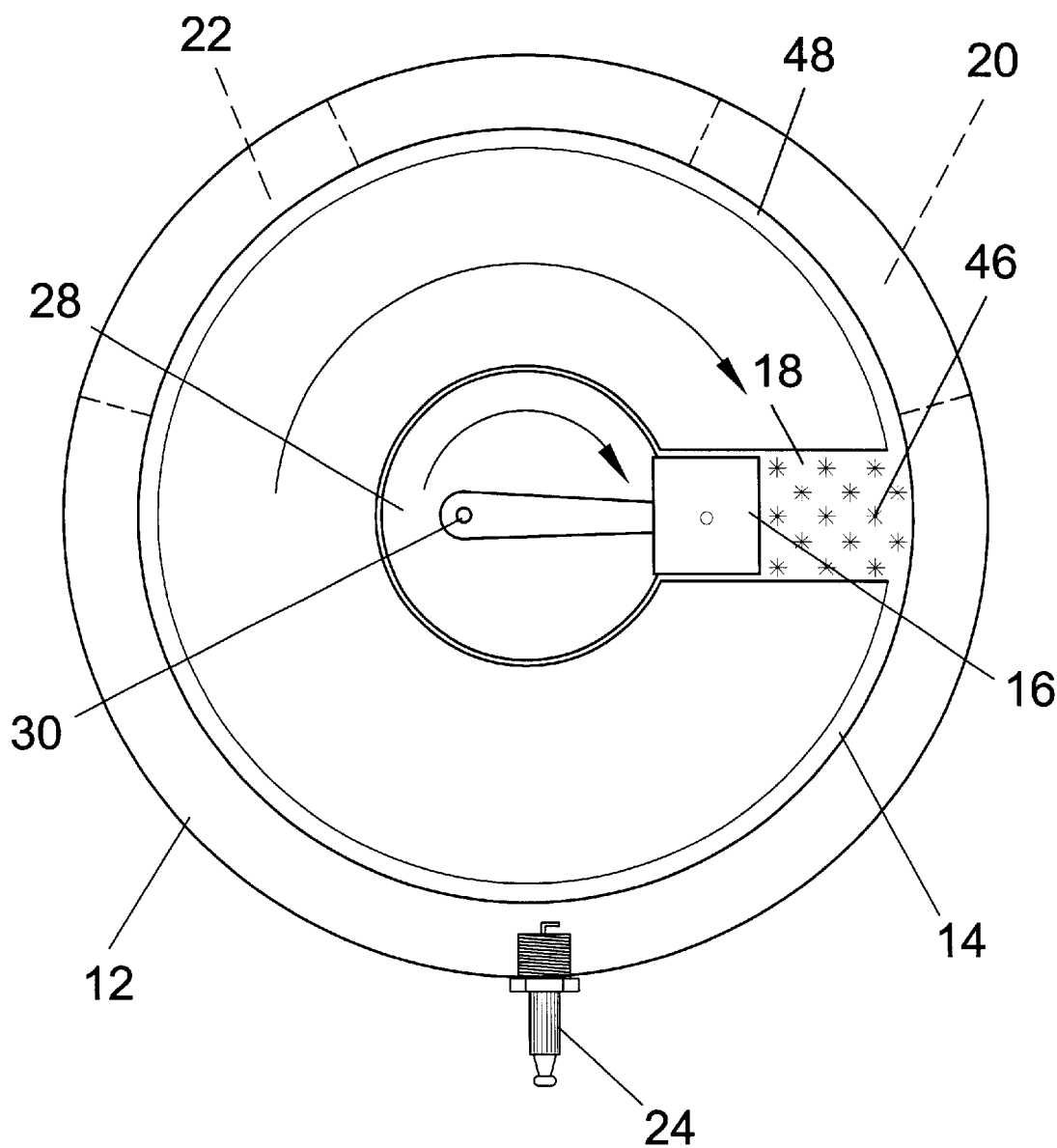
FIG. 3 is a top view of the present invention at the end of intake stroke and beginning of the compression stroke.

The end of the intake stroke and beginning of the compression stroke is depicted in FIG. 3 wherein the piston 16 is fully withdrawn centrally with a full charge 46 in the compression chamber 18 and maintained therein by the housing wall 48.

Figure 4:
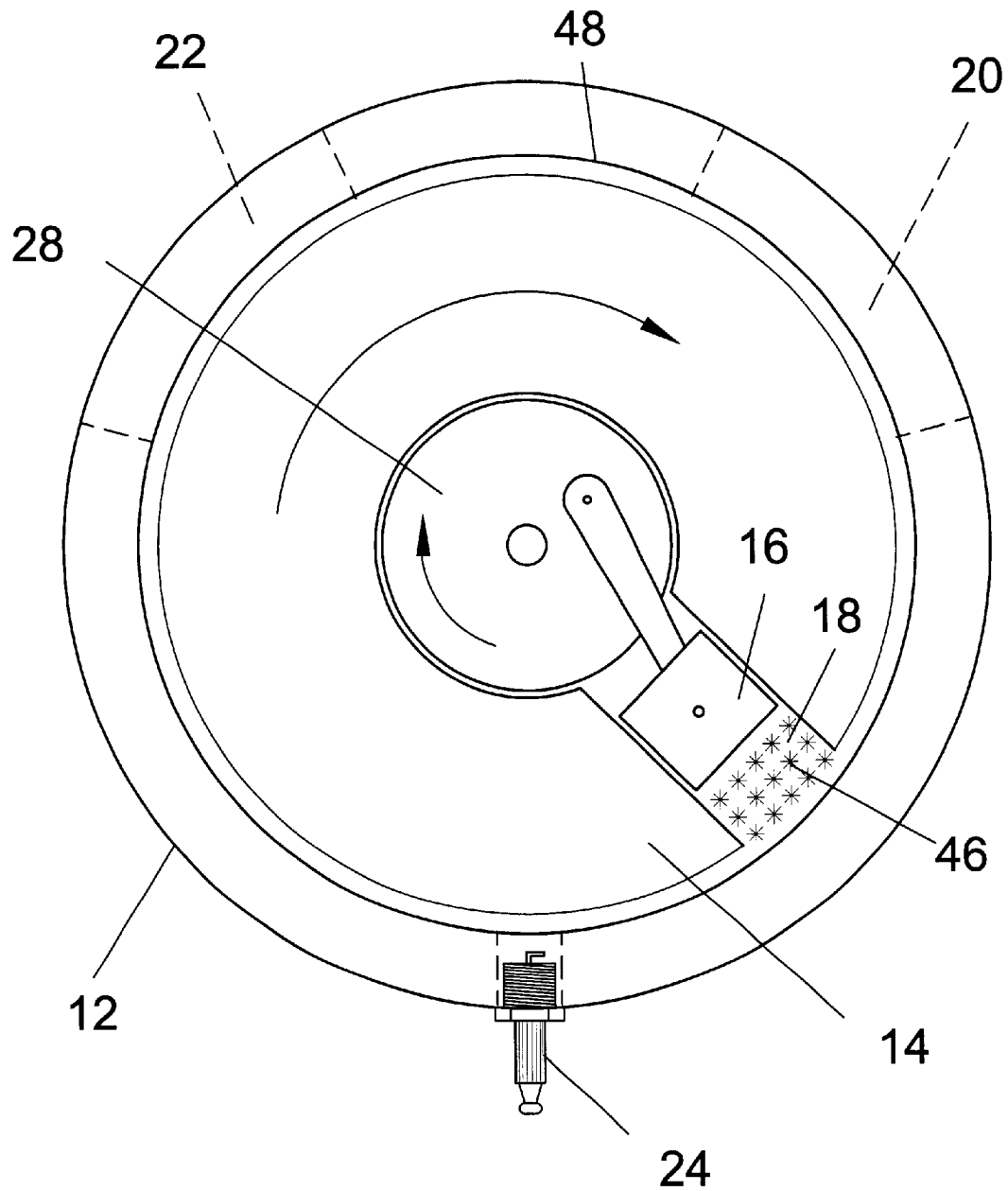
FIG. 4 is a top view of the present invention during the compression stroke.
Figure 5:
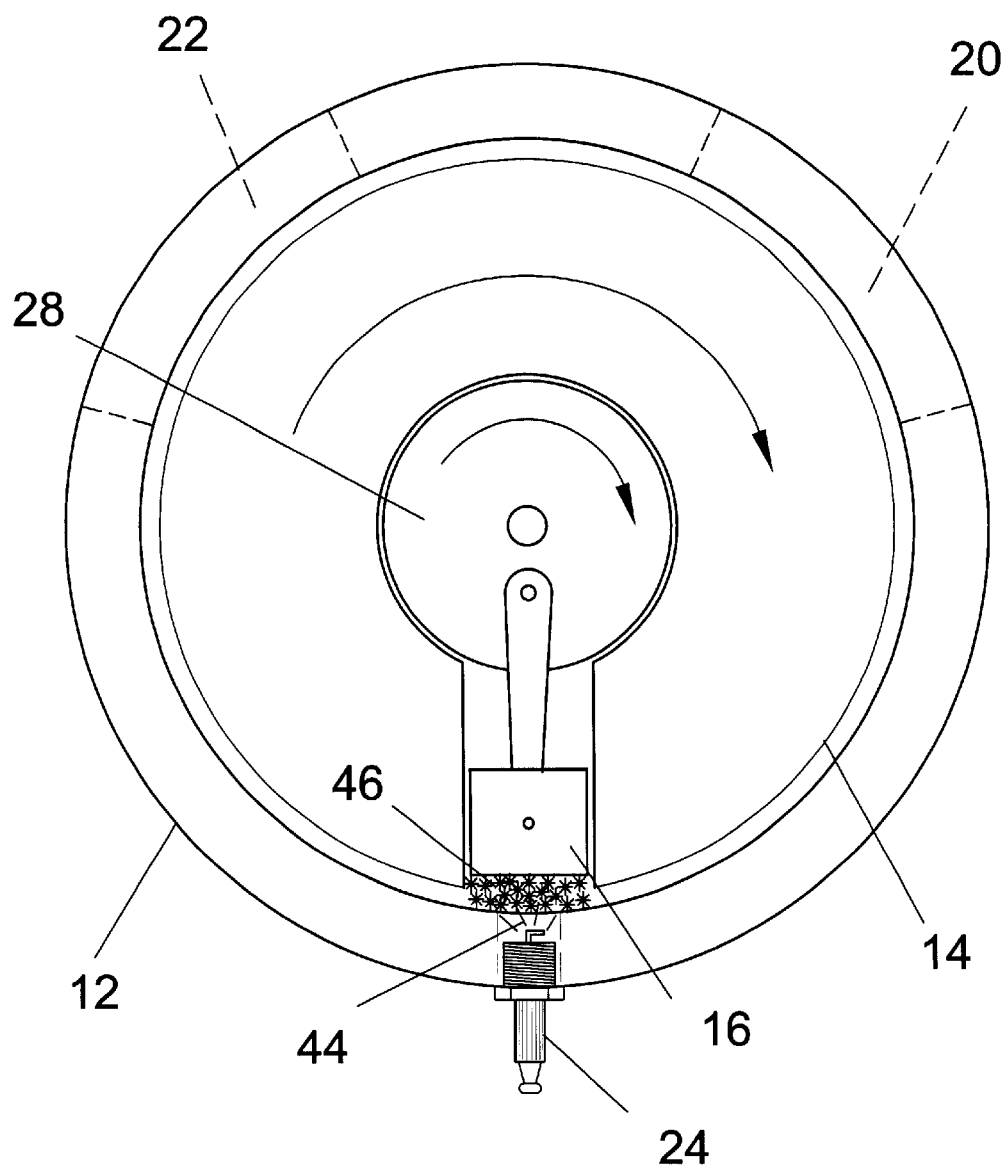
FIG. 5 is a top view of the present invention during the end of the compression stroke and the beginning of the power stroke.
Figure 6:
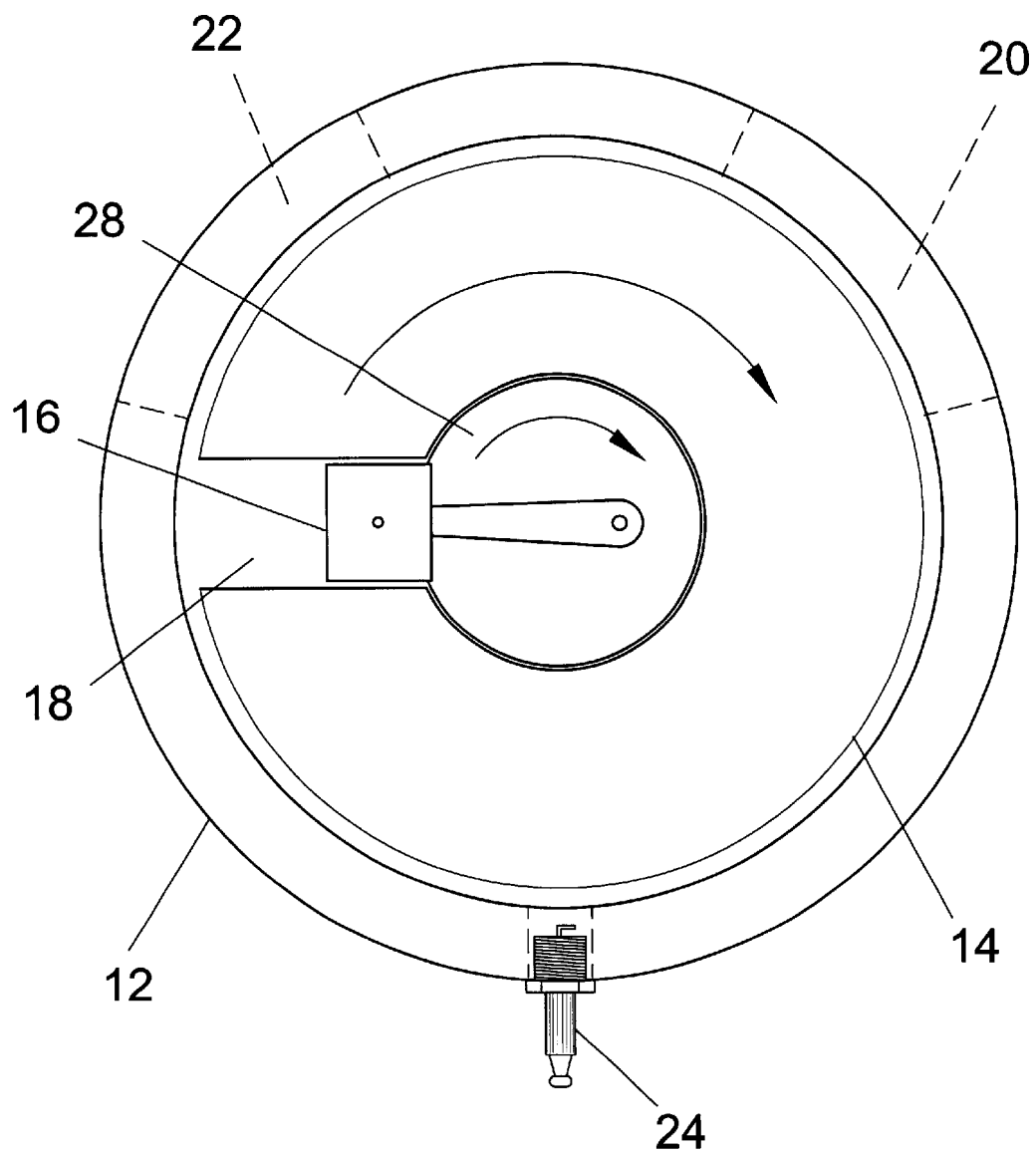
FIG. 6 is a top view of the present invention during the end of the power stroke.

FIGS. 4 and 5 show the compression stroke wherein the piston 16 is compressing the charge 46 as it advances towards the housing wall 48 and continues to do so until the piston 16 is almost fully extended.

Figure 7:
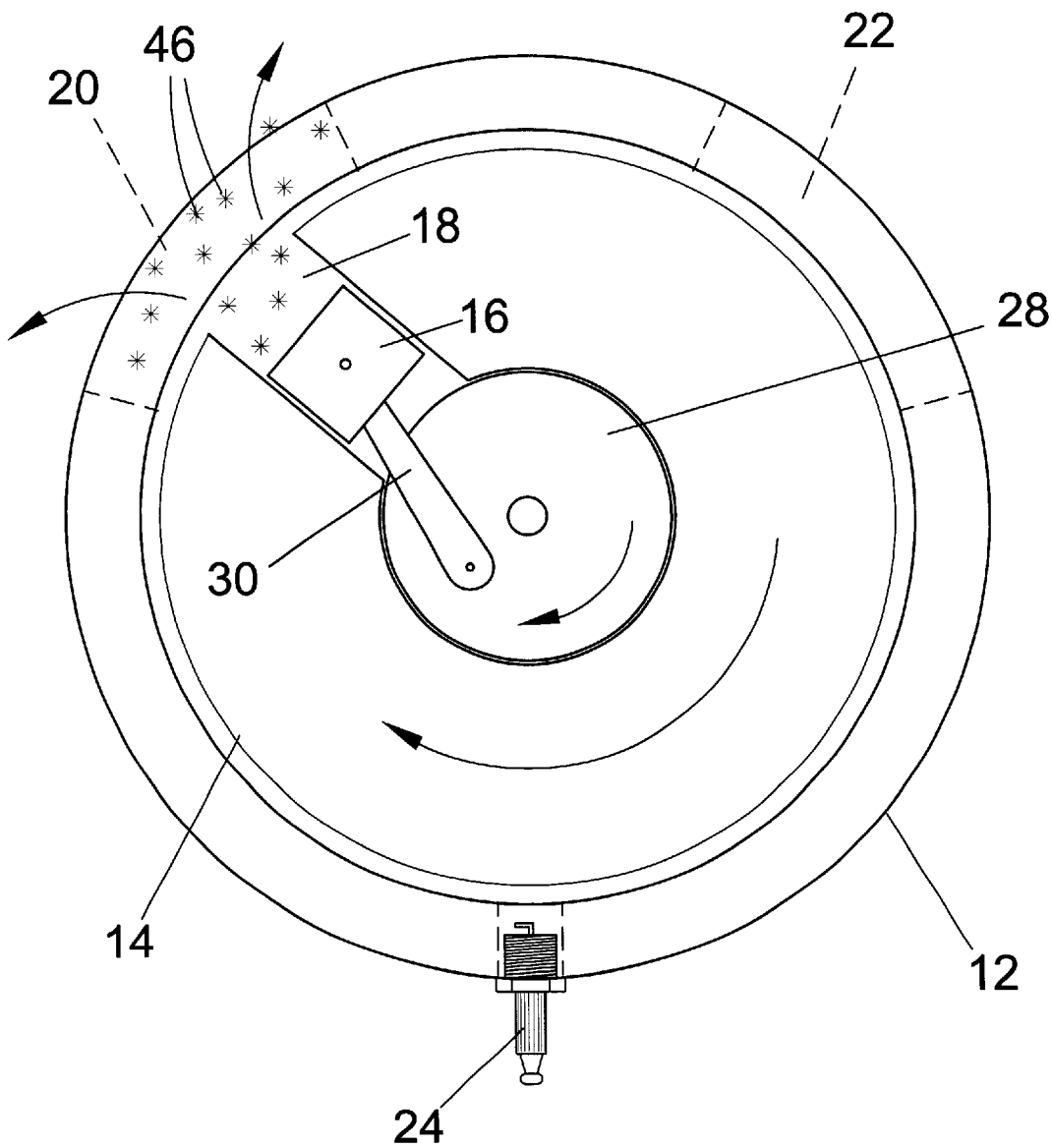
FIG. 7 is a top view of the present invention during the exhaust stroke.

FIG. 5 shows the compression chamber 18 aligned with the spark plug 24 which then initiates a spark 44 to ignite the charge 46 during the end of the compression stroke and the beginning of the power stroke. The power stroke is further depicted in FIGS. 6 and 7 and continues until the rotation of the cylinder block 14 aligns the compression chamber 18 with the exhaust port 22 and the peripheral movement of the piston 16 expels any waste remaining in the compression chamber 18 through said exhaust port 22 as shown in FIG. 7.

Figure 8:
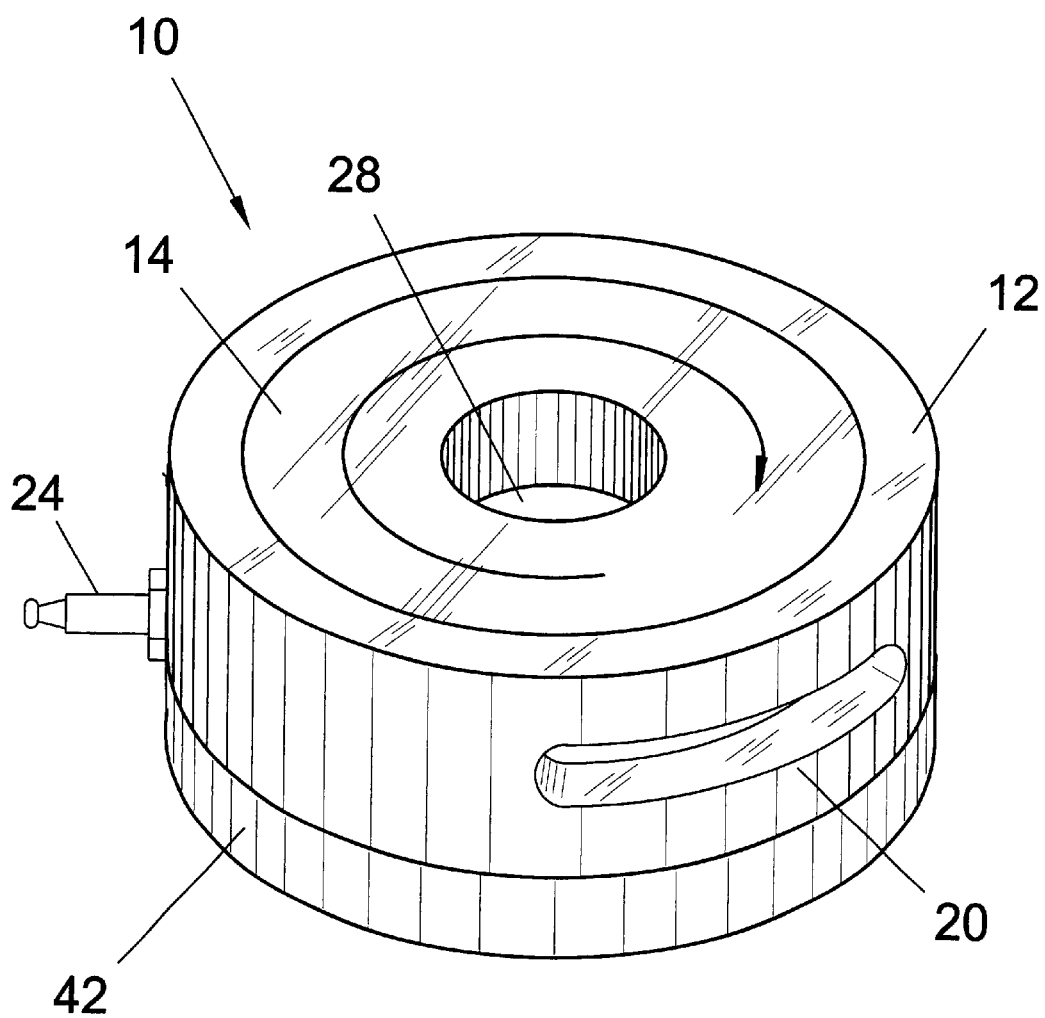
FIG. 8 is a perspective view of the present invention.

FIG. 8 shows the valveless revolving cylinder engine 10 comprising a fixed cylinder housing 12 that maintains a cylinder block 14 which rotates therein and is centrally bored to accommodate a rotating crank bearing disc 28 with a pivotally attached connecting rod 30 that communicates with the crank bearing disc 28 to drive a piston 16 through a radial bore 18 in the side wall of said cylinder block 14. The revolving piston engine 10 will render many overhead valve engines obsolete, as the low friction and high polar moment of inertia will enable this engine to idle at lower rpm. The gas flow potential of the ports 20,22 will enable high rpm power. The area and position of the ports 20,22 will be mechanically varied with engine load and rpm to optimize efficiency over a broad range of engine speeds. Elimination of the valve train will reduce cost and complexity. The revolving cylinder engine 10 could be manufactured for four stroke or two stroke operation but for illustrative purposes the four stroke operation will be demonstrated in the following drawing figures wherein the cylinder block 14 rotates one revolution per four stroke cycle and the crank bearing disc 28 rotates three times per cycle relative to fixed housing 12 (twice per cycle relative to cylinder block 14).

Figure 9:
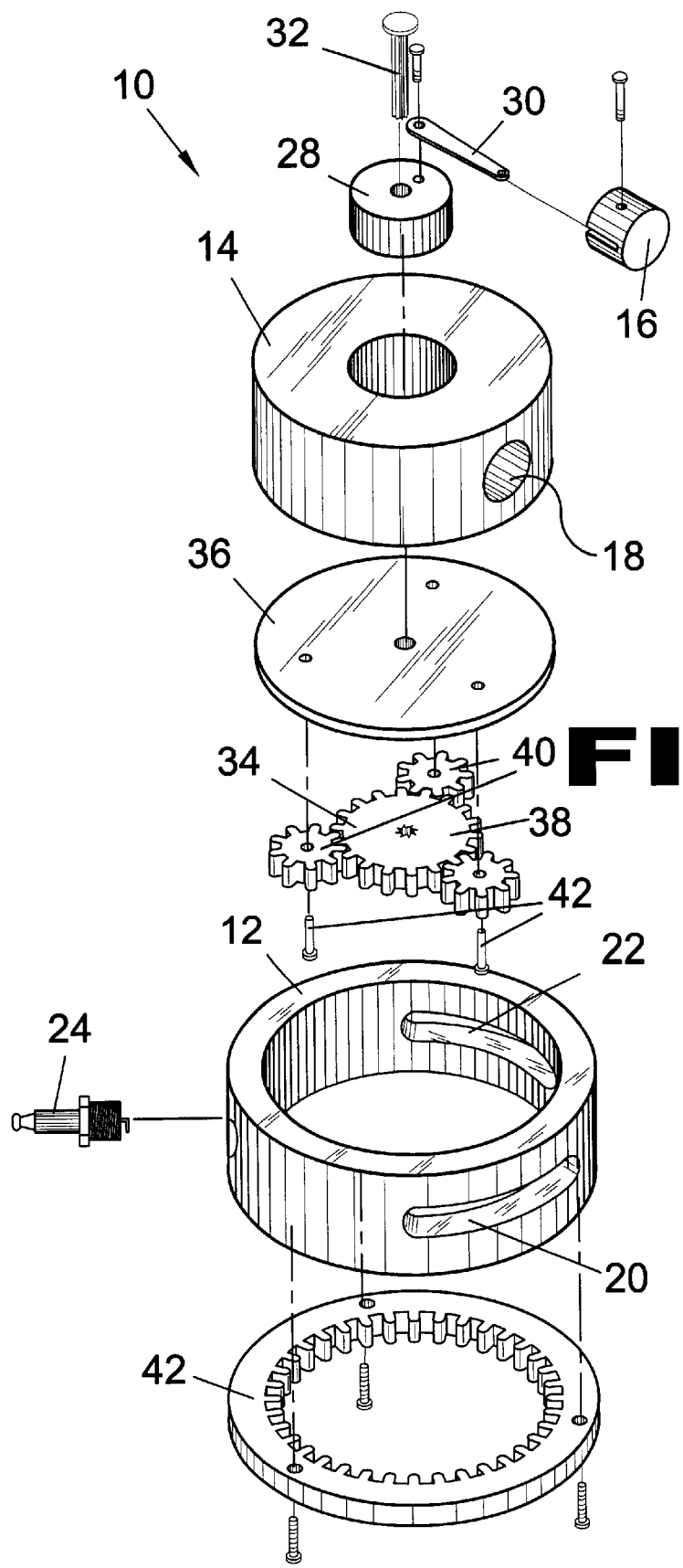
FIG. 9 is an exploded perspective view of the present invention.

FIG. 9 is an exploded view of the present invention 10 using a planetary gearset configuration 34 as a means for driving the cylinder block 14 and the crank-bearing disc 28 and timing the alignment of the various ports with the compression chamber 18.

Figure 10:
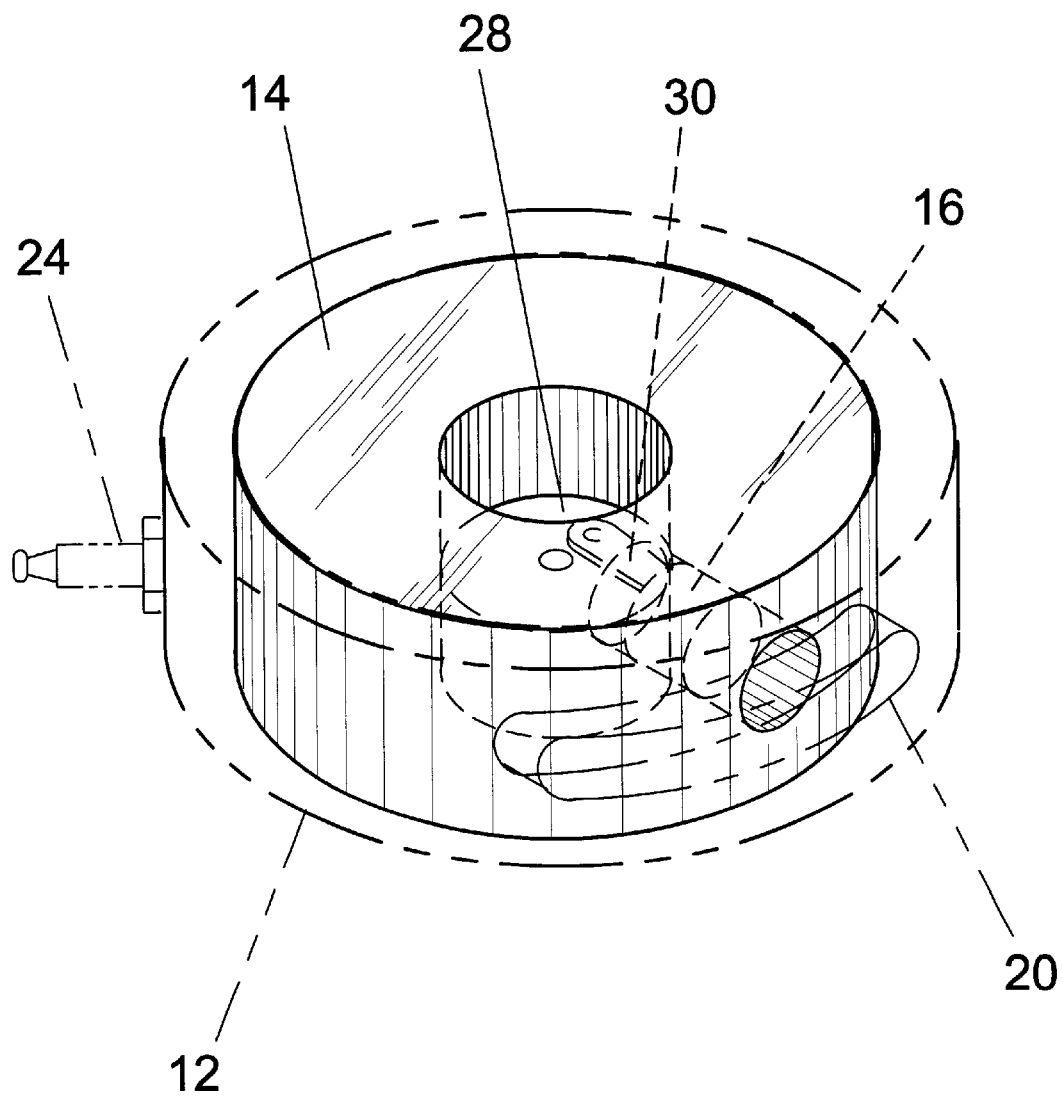
FIG. 10 is a perspective view of the cylinder block with the fixed housing shown in phantom line and the crank bearing disc, connecting rod and piston head shown in hidden line.

FIG. 10 is a perspective view of the cylinder block 14 and crank assembly. Shown is the cylinder block 14 with the crank bearing disc 28 and piston 16 installed with the fixed housing 12 depicted in phantom line. The cylinder block central bore contains the crankcase; functions as bearing bore for crank bearing disc 28. The compression chamber 18 is bored radially in the cylinder block 14. The crank assembly is the crank bearing disc 28 and attached connecting rod 30.

Figure 11:
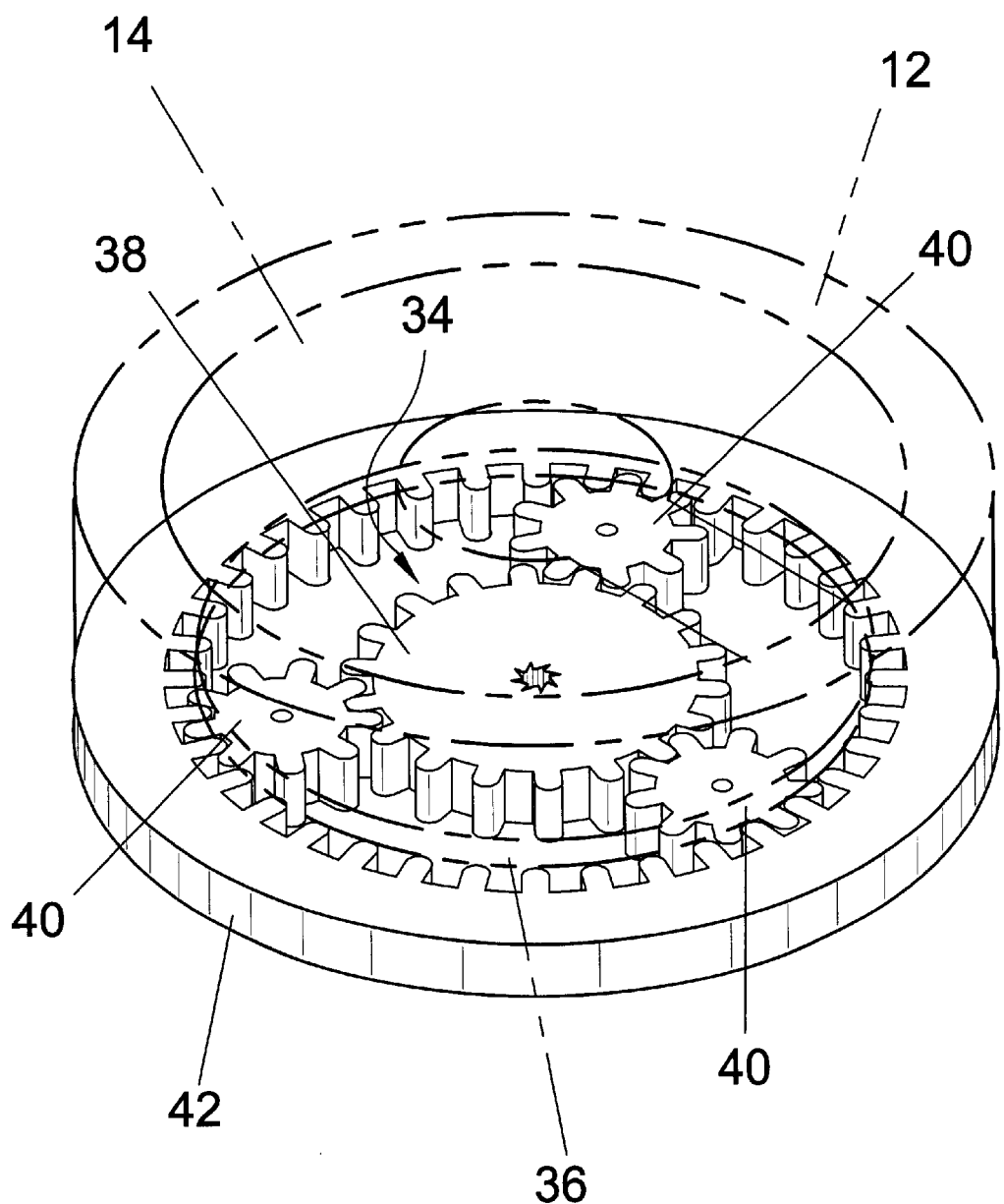
FIG. 11 is a perspective view of a planetary gear assembly.

FIG. 11 is a perspective view of the planetary gearset 34 with the fixed housing 12 and cylinder block 14 depicted in phantom line. The relative positioning of the fixed housing 12, cylinder block 14 and the crank assembly 27 is determined by the gear arrangement which in the following drawing figures uses a planetary gearset 34 although other suitable gearsets that accomplish the objectives of the present invention. The planetary gearset 34 comprises a planetary ring gear 42 connected to the fixed housing 12, two or more planet gears 40 axially connected to the planet carrier 36 which is fixed to the cylinder block 14, and a central sun gear 38 axially connected to the crank bearing disc 28.

Figure 12:
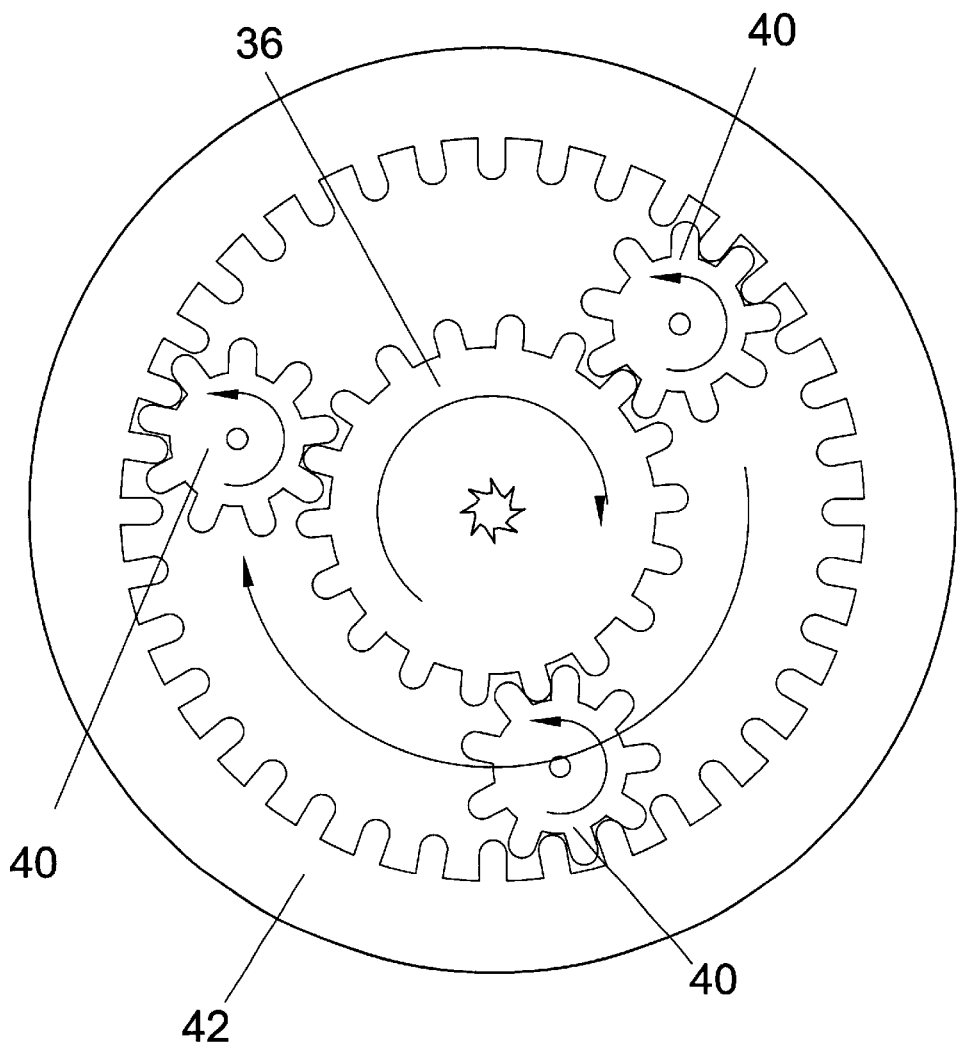
FIG. 12 is a top view of a planetary gearset configuration.

FIG. 12 is a top view of the planetary gearset 34. Alternative gear configurations are possible that also result in the cylinder block 14 and crank bearing disc 28 rotating in opposite directions. Regardless of gear design the ratio of torque to speed at a given power output differs from conventional engines.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A valveless revolving cylinder engine comprising:
   a) a cylindrical fixed housing member having a circular sidewall, an intake port and an exhaust port in said sidewall, and a means for introducing an ignition spark within the inner circumference of said sidewall;
   b) a cylinder block adapted to rotate concentrically within said housing member, wherein said cylinder block has a central recess and is radially bored to define a compression chamber extending transversely from said central recess to the outer circumference thereof;
   c) a piston assembly adapted to travel within said compression chamber comprising a piston and attached pivoting connecting rod;
   d) a driving and timing means providing the axial rotation of said cylinder block and the reciprocating movement of said piston within said compression chamber in concert with one another so as to place the piston in specific positions and traveling in predetermined directions within said compression chamber as said cylinder block rotates and sequentially aligns compression chamber with said intake port, exhaust port, and said spark ignition means during cycling; and
   e) said driving and timing means including:
      i) a substantially cylindrical crank bearing disc adapted to rotate concentrically within said radial throughbore of said cylinder block;
      ii) means for rotating said cylinder block and said crank bearing disc at a predetermined ratio; and
      iii) means for pivotally securing said connecting rod to said crank bearing disc to provide the reciprocating action of said piston within said compression chamber in reaction to the axial rotation of said crank bearing-disc.

2. A valveless revolving cylinder engine as recited in claim 1, wherein said rotating means is a gearset arrangement.

3. A valveless revolving cylinder engine as recited in claim 1, wherein said crank bearing disc rotates three times per cycle relative to said fixed housing and twice per cycle relative to said cylinder block.

4. A valveless revolving cylinder engine as recited in claim 2, wherein said rotating means is a planetary gearset comprising:
   a) a stationary planetary ring gear;
   b) a sun gear having an irregularly shaped central recess;
   c) at least two planet gears interacting with said sun gear and said planetary ring gear;
   d) a planet carrier;
   e) means for fastening said planetary ring gear to said fixed housing;
   f) means for axially connecting said planet gears with said planet carrier and said cylinder block in a fashion that would rotate said cylinder block as said planet gears travel along said planetary ring;
   g) an irregularly shaped recess in said cylinder block configured to conform to said recess in said sun gear;
   h) a spline shaft configured to conform with and be inserted into said irregularly shaped recesses in said sun gear and said crank bearing disc thus enabling the rotation of said sun gear as driven by the travel of said planet gears to rotate said spline shaft and the engaged crank bearing disc.

* * * * *